United States Patent
Huber et al.

[11] Patent Number: 6,050,755
[45] Date of Patent: Apr. 18, 2000

[54] APPARATUS FOR CHAMFERING AND DEBURRING GEAR TOOTH END EDGES

[75] Inventors: Manfred Huber, Munich; Karl Schaferling, Unterschleissheim, both of Germany

[73] Assignee: The Gleason Works, Rochester, N.Y.

[21] Appl. No.: 09/137,794

[22] Filed: Aug. 21, 1998

[30] Foreign Application Priority Data

Aug. 22, 1997 [DE] Germany ................ 297 15 092 U

[51] Int. Cl.⁷ .................................................. B23F 19/00
[52] U.S. Cl. ................................ 409/9; 407/27; 409/8; 409/49
[58] Field of Search .................. 409/8, 9, 45, 37; 29/33 A; 407/27; 22/102; 451/47

[56] References Cited

U.S. PATENT DOCUMENTS

| | | | |
|---|---|---|---|
| 3,729,967 | 5/1973 | Bauknecht et al. | 72/102 |
| 3,894,418 | 7/1975 | Horl . | |
| 4,068,558 | 1/1978 | Loos | 407/27 X |
| 4,155,677 | 5/1979 | Loos | 407/27 |
| 4,334,810 | 6/1982 | Behnke et al. | 409/9 |
| 5,882,154 | 3/1999 | Mihara et al. | 409/49 X |

FOREIGN PATENT DOCUMENTS

| | | | |
|---|---|---|---|
| 1016534 | 9/1957 | Germany | 409/9 |
| 2319060 | 10/1974 | Germany . | |

OTHER PUBLICATIONS

Hurth brochure, "Hurth Rotary Deburring Tools" Carl Hurth Maschinen und Zahnradfabrik GmbH & Co., Munich, Germany, 1985.

*Primary Examiner*—William Briggs
*Attorney, Agent, or Firm*—Robert L. McDowell

[57] ABSTRACT

Apparatus for chamfering and deburring the tooth end edges of straight and skew-teeth gears, comprising at least one deburring wheel arranged endways with respect to the work and meshing with it in finishing the tooth edges, comprising a toothed guide gear arranged axially beside the deburring wheel, joined to it nonrotatably and meshing with the work, comprising at least one secondary burr disk arranged rotatably endways with respect to the work on the same side as the deburring wheel and finishing the tooth edges, and comprising a machine frame featuring a work clamping fixture and a bed for a slide supporting the tool consisting of deburring wheel and guide gear, and supporting the secondary burr disk, said slide allowing infeed transverse to the axis of rotation of the work.

7 Claims, 4 Drawing Sheets

APPARATUS FOR CHAMFERING AND
DEBURRING GEAR TOOTH END EDGES

FIELD OF THE INVENTION

The invention relates to an apparatus for chamfering and deburring the tooth end edges of straight and skew-teeth gears, comprising at least one deburring wheel arranged endways with respect to the work and meshing with it in finishing the tooth edges, comprising a toothed guide gear arranged axially beside the deburring wheel, joined to it nonrotatably and meshing with the work, comprising at least one secondary burr disk arranged rotatably endways with respect to the work on the same side as the deburring wheel and finishing the tooth edges, and comprising a machine frame featuring a work clamping fixture and a bed for a slide supporting the tool consisting of deburring wheel and guide gear, and supporting the secondary burr disk, said slide allowing infeed transverse to the axis of rotation of the work.

BACKGROUND OF THE INVENTION

Basically, such a device is known from DE-AS 23 19 060 and from the company brochure "HURTH Wälzgratwerkzeuge" (HURTH Generating Burr Tools). Forming on gears made by a cutting process, on the tooth end edges, is a burr that needs to be removed for various reasons. Such burr is troublesome, since in the subsequent operations a flat face, for example the end face of the gear, frequently is meant to serve as clamping and reference surface.

A particular risk to the teeth is a hardened burr, which at the latest will come off as the gears run in the transmission and can damage the tooth flanks. Apart from that, a burr left behind represents also an injury hazard in handling the work. Therefore, numerous burr removal methods and apparatuses have been in use for a long time. Removing just the burrs, however, is mostly insufficient. Hardening, for example, involves the risk that the pointed edge becomes as hard as glass, due to excess carburization, and then breaks off under load. Therefore, the tooth end edge must additionally be provided with a chamfer; the latter also protects the active tooth surface from damage. This objective is accomplished with the categorical apparatus, in that work material at the edge is displaced between the tooth flank and the end face so as to produce a single-flank or dual-flank chamfer. The work material is in this plastic deformation displaced by the deburring wheel toward the end face, creating a so-called secondary burr. This secondary burr is removed with a cutter. Termed secondary burr cutter, this cutter is known in various embodiments and may be configured, e.g., as a rotatable disk.

In the prior systems the work is machined wet using a cutting oil or cutting emulsion. This fluid not only contributes to machining the work, by reducing the friction, but serves also the removal of the accruing chips. Using such cutting fluid, however, is associated with several disadvantages. Following the deburring, the work is hardened, wherein cutting oil residues represent a hindrance. Besides, cutting oil is relatively expensive. But high costs are caused not only by its procurement, but also by the disposal of the spent cutting oil, that is, of the steel chips saturated with cutting oil. Therefore, there is a need for a deburring system that is able to operate without the use of cutting fluid. This need went unsatisfied so far, because the chips produced in deburring scatter around uncontrolled, due to the absence of a cutting fluid in the system, and result in disturbances. For example, the chips may proceed between the guide gear and the work and may be rolled into the latter, which is extremely disturbing. A further problem in dry deburring is the specific chip removal from the working area. While in wet machining the draining cutting fluid carries the chips along, dry machining involves the risk that the chips, scattering uncontrolled, will accumulate and form undesirable pockets that may impair the operation.

Therefore, the objective underlying the invention is to improve the categorical apparatus to the effect that dry machining of the work is possible. This objective is satisfied according to the invention in that the bed is on the tooling end rearwardly inclined approximately 45° in the direction of tool rotation, in that the slide allows down infeed toward the clamping fixture, in that the secondary burr disk meshes with the upper area of the work, in that a front wall opposing the bed is provided in the working area, said wall being forwardly inclined about 45° opposite to the direction of tool rotation, creating a chip hopper of about 90°, and in that the guide gear has in its center a peripheral groove.

The inclined arrangement of the bed in the direction of tool rotation, and thus also in the direction of rotation of the secondary burr disk, achieves that the accruing chips will not proceed between the work and the guide gear, but will be deflected down from the work area into the hopper formed by the bed and the as well inclined front wall. In the event that chips created in deburring should nonetheless proceed between the work and guide gear, the center peripheral groove of the guide gear prevents the chips from being rolled into the tooth flanks of the work.

To further reduce the risk of chip penetration between the guide gear and the work, the secondary burr disk has an outwardly inclined peripheral edge. This achieves a sideways deflection of the chips formed.

Since dry deburring produces very small particles that may deposit on the guide gear and the dressing wheel, an improvement of the invention is characterized by a rotating brush able to engage the tool when the slide is in its upper position of rest, away from the work.

In view of the possible deposition of small particles on the tool, a further provision is coating the guide gear and the deburring wheel with a material reducing friction.

To prevent dry chips from clinging to the walls of the apparatus, its interior is lined with stainless steel panels of low intrinsic magnetism.

A favorable improvement of the invention is characterized by a lift mechanism enabling the superimposition of a lift motion on the radial infeed motion of the tool. This makes possible a defined increase of the axial spacing of work and tool prior to infeeding the secondary burr disk, excluding practically entirely the possibility that chips may be rolled into the tooth flanks of the work by the guide gear.

An exemplary embodiment of the apparatus is illustrated in the drawing and more fully explained hereafter.

DETAILED DESCRIPTION OF THE INVENTION

Figure 1:
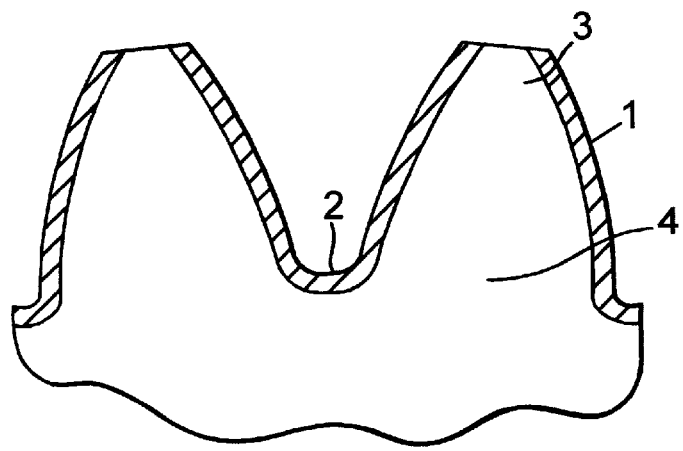
FIG. 1 shows a view of the end face of two work teeth whose edges are to be chamfered on the tooth ends with the apparatus, as indicated by hatching.
Figure 2:
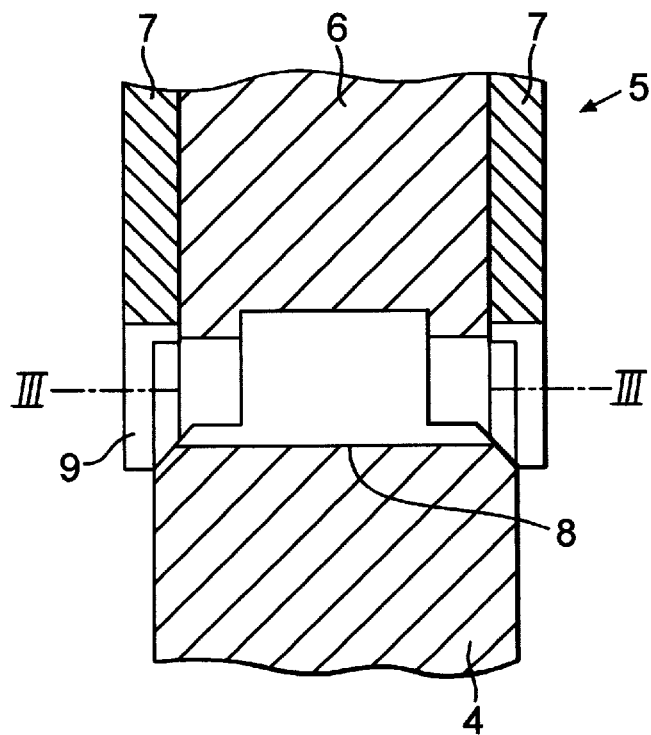
FIG. 2 shows schematically a section through the teeth of the work meshing with the tool.
Figure 3:
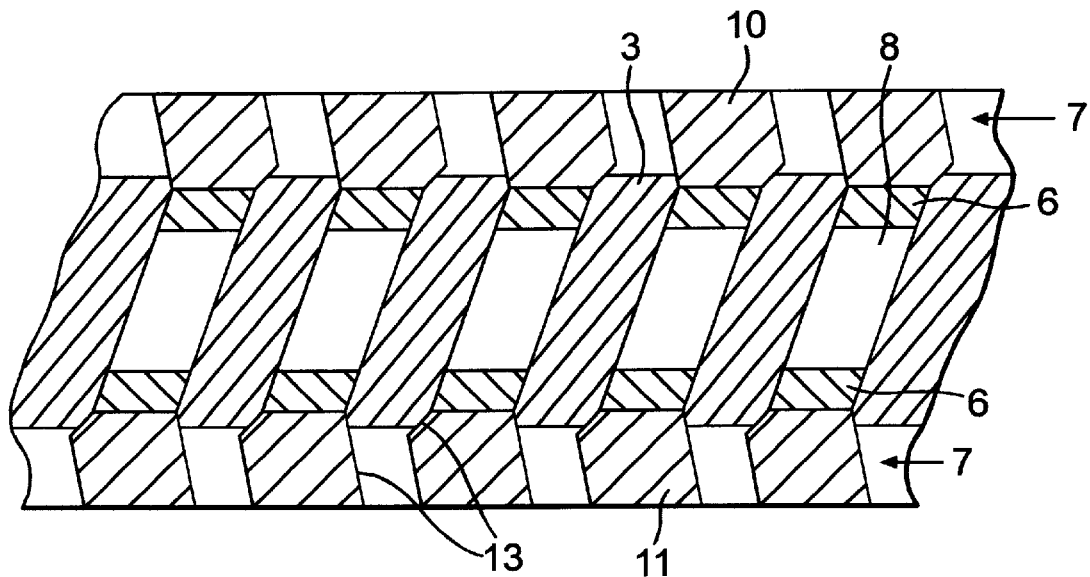
FIG. 3 shows a section along line III—III in FIG. 2, and at that, rolled off.

The apparatus illustrated in the drawing figures serves to skew, respectively chamfer and debur, the end edges 1 and/or the bottom edges 2 on the ends of the teeth 3 of a work 4. To this end, provisions are that the work 4 and a toothed tool 5 roll with not illustrated parallel axes on each other such that their teeth mesh. The tool 5 consists of a noncutting toothed guide gear 6, on the two ends of which one deburring wheel 7 each is mounted with known, and therefore not illustrated, means. As follows from FIG. 2, the guide gear 6 has a center recess forming a peripheral groove 8. The deburring wheels are on their circumference provided with teeth 9 which outwardly, on the tooth flanks, have chamfers, and at that, such that they penetrate from the end faces into the gashes of the work 4 in such a way that the flanks of the teeth 9 of the deburring wheels 7 are able to finish the edges 1, 2 on the flanks and in the bottom of the gash on the ends of the teeth 3. FIG. 3 illustrates the teeth 3 of the work 4 in mesh with the teeth of the guide gear 6 and the deburring wheels 7. Endways, the teeth 10, 11 of the deburring wheels 7 engage the gashes of the work 4. The tool 5 is infed radially relative to the work 4, with the flanks 13 of the deburring wheels 7 bearing down on the edges on ends of the teeth 3 of the work 4, skewing or chamfering them by plastic deformation. To reduced friction, the guide gear 6 and the two deburring wheels 7 are coated with a low-friction material.

Figure 4:
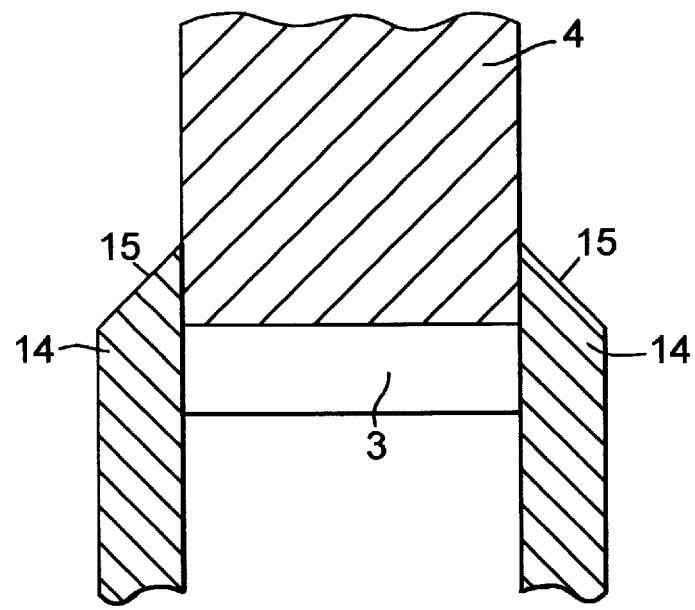
FIG. 4 shows a section through the work meshing with two secondary burr disks.

Stock of the work 4 is in this plastic deformation pushed toward the end faces, creating a so-called secondary burr. The flow of stock toward the gash is extensively prevented by the guide gear 6. The secondary burr is removed with two secondary disks 14, which are mounted rotatably, variable in spacing and angle, on both sides of the work. The axes of the work 4 and of the two secondary burr disks 14 are arranged parallel, with spacing, so that the secondary burr disks 14 overlap the teeth 3 of the work 4, as shown in FIG. 4. In order to cause a sideways deflection from the work 4, of the chips produced in the removal of the secondary burr, the secondary burr disks 14 have an outwardly inclined peripheral rim 15.

Figure 5:
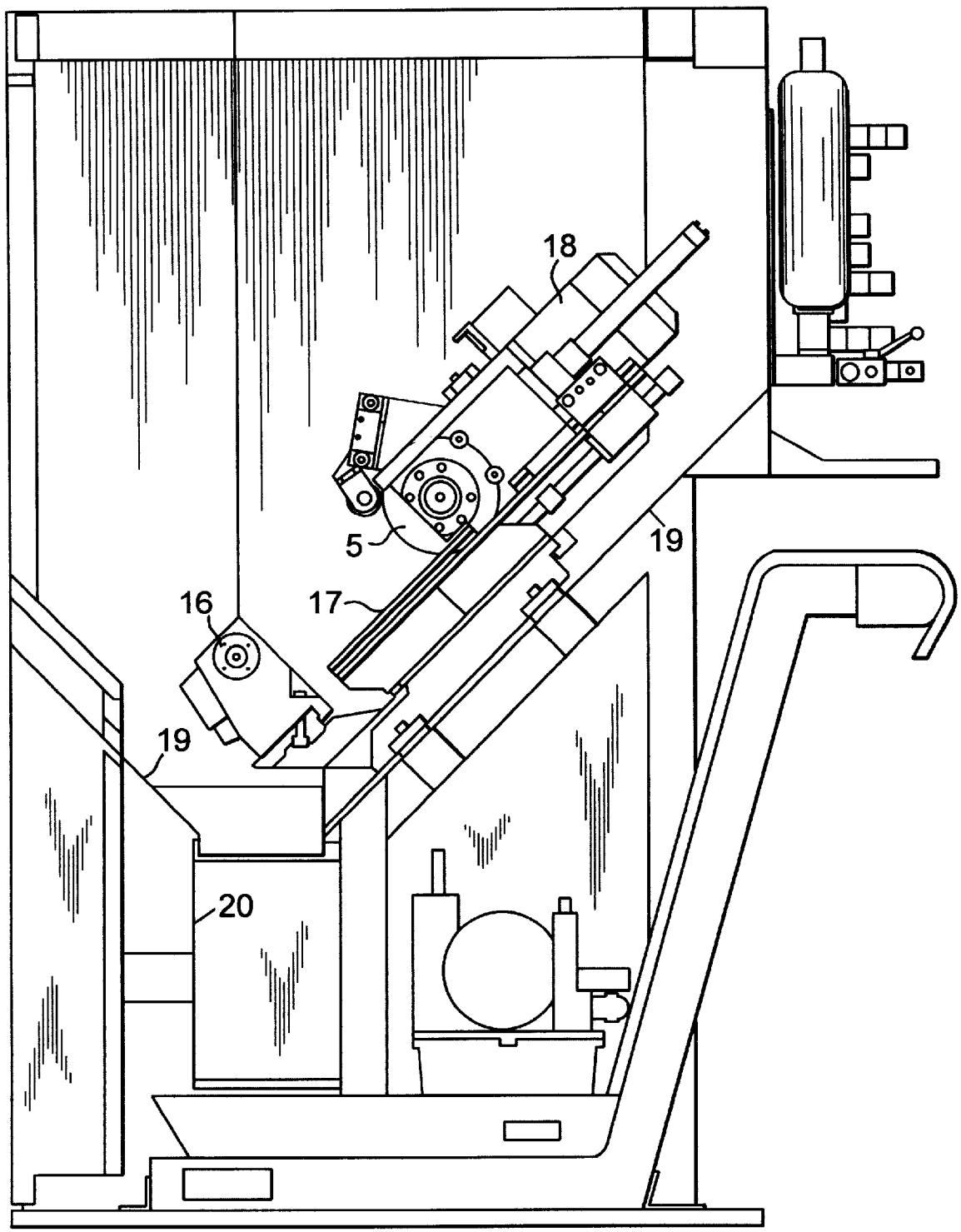
FIG. 5 shows a schematic side elevation of the apparatus in loading position, and FIG. 6, scaled up, shows a section of FIG. 5 in the operating position of the apparatus, turned 450.

The side elevation of the apparatus according to FIG. 5 shows a clamping fixture 16 for mounting the work and, extending upward from the clamping fixture at an angle of about 45°, a bed 17 for a slide 18 supporting the tool 5 and the two secondary burr disks 14. The arrangement of the secondary burr disks 14 on the slide 18 is such that they rest on the upper area of the work 4 with the slide 18 assuming its operating position shown in FIG. 6.

In the top position of the slide 18 as shown in FIG. 5, the tool 5 can be meshed with a (not illustrated) rotating brush, which cleans of the tool of chips and the like.

The interior of the apparatus is lined with stainless steel panels of low intrinsic magnetism 19, inclined at an angle of approximately 45°. The panels 19 form a hopper for chip removal into a collection box 20. Instead of a bottom, a conveyer for removal of the collected chips may be arranged beneath the collection box 20.

Figure 6:
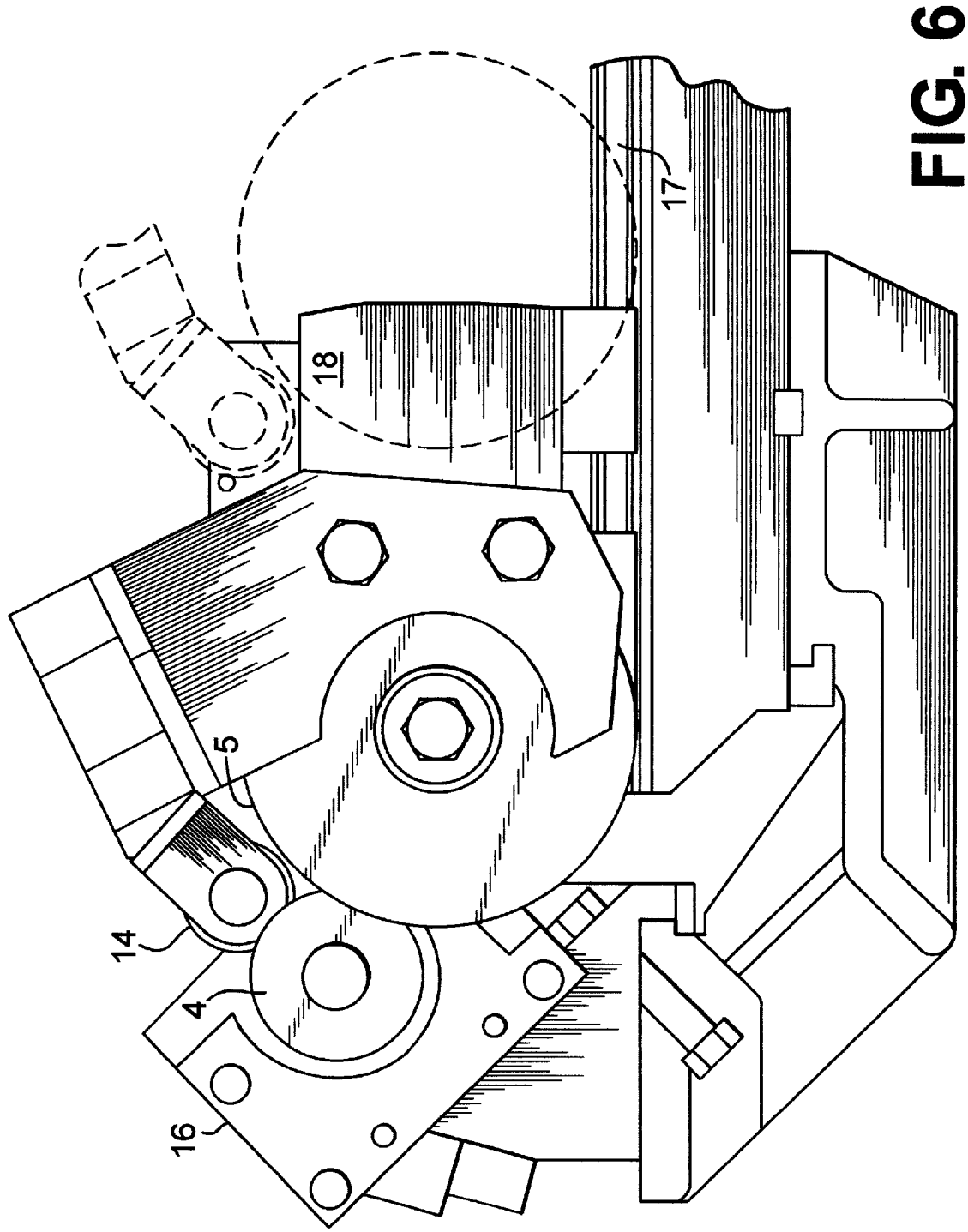

The axes of rotation of the work 4, tool 5 and the secondary burr disks 14 are oriented horizontally, and the tool 5 is powered to rotate clockwise according to the illustration in FIG. 5 and 6. For deburring a work 4 mounted in the clamping fixture 16, the slide 18 is infed down from its position illustrated in FIG. 5 on its bed 17. Once the guide gear 6 meshes with the work 4, the tool 5 is powered to rotate clockwise. Consequently, the work 4 turns counterclockwise. Following the chamfering and deburring of the end edges 1 and, as the case may be, the bottom edges 2 of the teeth 3 of the work 4, the two secondary burr disks 14 are being infed axially. Caused to mesh with the work 4 under friction fit, the two secondary burr disks 14 are thus rotated clockwise according to the illustrations in FIGS. 5 and 6. The particular spatial coordination of the work 4, tool 5 and the two secondary burr disks 14 causes the chips produced in the secondary burr removal to the thrown down into the collection box 20 disposed beneath the inclined panels 19. Hence, the risk that the chips will be rolled into the tooth flanks of the work 4 by the guide gear 6 is extremely slight. To preclude this possibility practically entirely, the axial spacing between work 4 and tool 5 may be increased definably prior to the infeed of the two secondary burr disks 14. Provided to that end may be a (not illustrated) lift mechanism that makes it possible to superimpose a lift motion on the radial infeed motion of the tool.

To enable the simultaneous deburring of two sets of teeth, for example on shafts, a further slide may be mounted on the bed, supporting a further tool comprised of deburring wheel and guide gear and at least one additional secondary burr disk.

What is claimed is:

1. Apparatus for chamfering and deburring the tooth end edges of straight and skew-teeth gears, comprising at least one deburring wheel arranged endways with respect to the work and meshing with it in finishing the tooth edges, comprising:

a toothed guide gear arranged axially beside the deburring gear, joined to it nonrotatably and meshing with the work, at least one secondary burr disk arranged rotatably endways with respect to the work on the same side as the deburring wheel and finishing the tooth edges, and a machine frame featuring a work clamping fixture and a bed for a slide supporting the tool consisting of the deburring wheel and the guide gear, and supporting the secondary burr disk, said slide allowing infeed transverse to the axis of rotation of the work, characterized in that the bed (17) is on the tool side rearwardly inclined approximately 45° in the direction of rotation of the tool (5), in that the slide (18) is adapted for infeed down toward the clamping fixture (16), in that the secondary burr disk (14) engages the top area of the work (4), in that a front wall (19) opposing the bed (17) is provided in the working area, said wall being forwardly inclined approximately 45° in the direction of rotation of the tool (5), thus creating a chip hopper of approximately 90°, and in that the guide gear (6) has a center peripheral groove (8).

2. Apparatus according to claim 1, characterized in that the secondary burr disk (14) has an outwardly inclined peripheral edge (15).

3. Apparatus according to claim 1, characterized by a rotating brush adapted for engaging the tool (5) when the slide (18) is in its upper position of rest, away from the work (4).

4. Apparatus according to claim 1, characterized in that the guide gear (6) and the deburring wheel (7) are coated with a material reducing friction.

5. Apparatus according to claim 1, characterized in that the chip hopper is lined with stainless steel panels of low intrinsic magnetism.

6. Apparatus according to claim 1, characterized by a lift mechanism which makes it possible to superimpose a lift motion on the radial infeed motion of the tool.

7. Apparatus according to claim 1, characterized in that a further slide is mounted on the bed, said further slide supporting a further tool consisting of the deburring wheel and the guide gear, and supporting a further secondary burr wheel.

* * * * *